(No Model.)
G. SALMON.
Kitchen Boiler.
No. 238,442. Patented March 1, 1881.
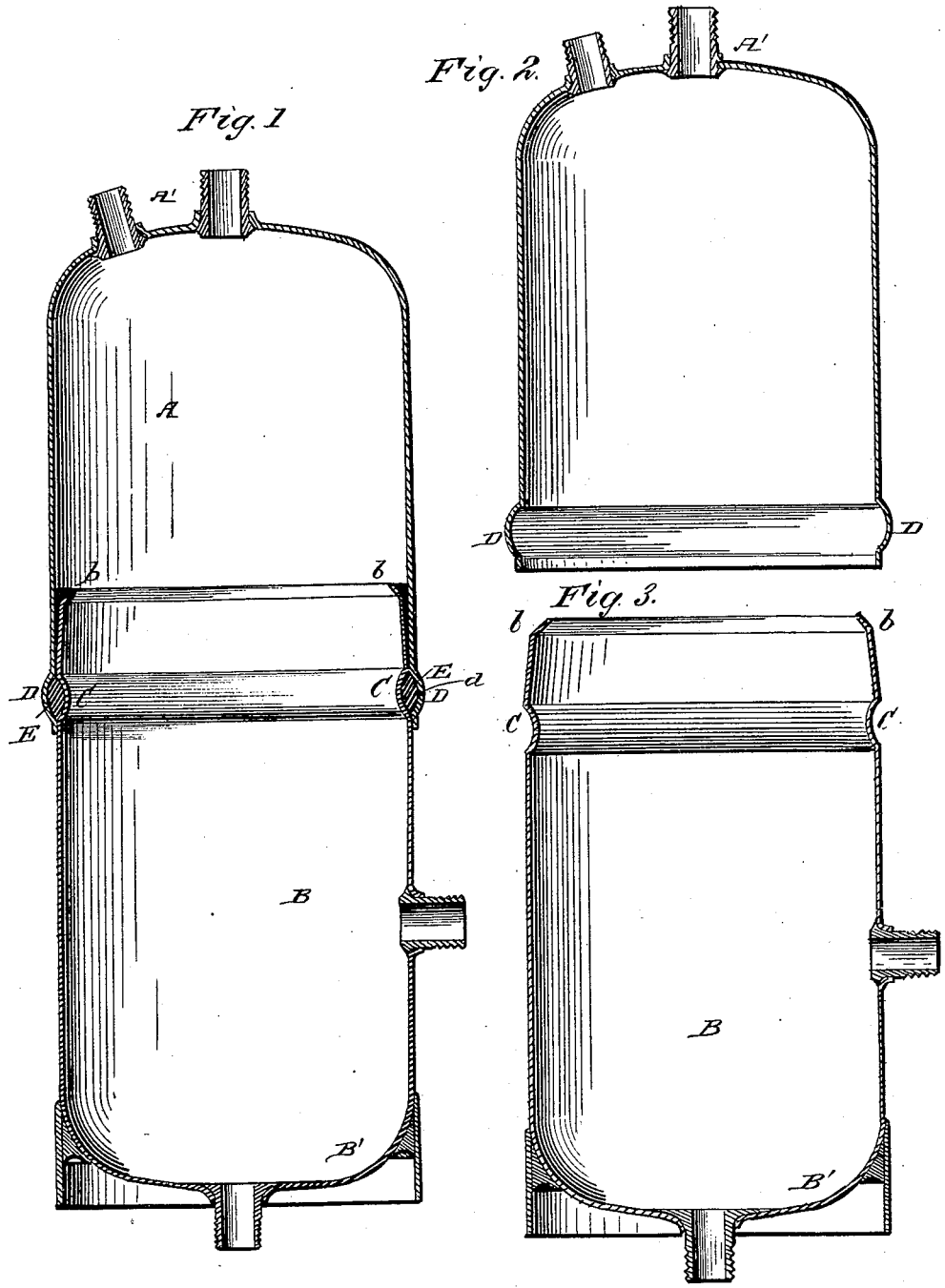
Witnesses
Fred G. Dittrich
Joseph T. Power
Inventor
George Salmon,
by Louis Bagger & Co.
Attorneys

UNITED STATES PATENT OFFICE.

GEORGE SALMON, OF TAUNTON, MASSACHUSETTS.

KITCHEN-BOILER.

SPECIFICATION forming part of Letters Patent No. 238,442, dated March 1, 1881.

Application filed November 15, 1880. (No model.)

*To all whom it may concern:*

Be it known that I, GEORGE SALMON, of Taunton, in the county of Bristol and State of Massachusetts, have invented certain new and useful Improvements in Kitchen-Boilers; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical section of my improved kitchen-boiler. Fig. 2 is a longitudinal section of the upper half or top shell, and Fig. 3 is a similar section of the lower half or bottom shell.

Similar letters of reference indicate corresponding parts in all the figures.

My invention contemplates certain improvements in the manufacture of kitchen or house boilers, and has for its object to produce a strong and durable boiler that shall not be liable to give or wear out, and which shall be absolutely free from leakage.

In the annexed drawings, A represents the upper, and B the lower, cylindrical shell of the boiler, which are made in one piece with their respective heads A' B'. The top part, A, is made a trifle larger than the bottom part, B, so that the latter may be inserted into the former, as shown in Fig. 1 of the drawings, and the upper rim of the bottom part is turned inward to form a flange, $b$, for the purpose hereinafter stated. A short distance below this flange is a convex bead, C, formed in any suitable manner, and the upper part or top shell, A, has a corresponding convex or bulging bead, D, just above its upper rim or edge.

The seamless shells A B should be brazed at the top and bottom heads to give them the requisite degree of strength. After they have been put together as shown in Fig. 1, (with a very tight joint between the laps, and not quite as open as shown in the drawings, which are made that way for the purpose of illustrating the method of soldering,) the lap-joint is sweated and soldered from the inside by pouring the solder into the narrow bead formed between the inwardly-projecting flange $b$ of the bottom shell and the encircling wall of the outer shell. By applying the solder through one of the top couplings and looking through the other, while a candle or gas flame is inserted through the bottom opening, the operator can readily do the work and make a neat and finished ring-joint on the inside. Next I drill a small hole, $d$, through the outer bead, D, through which I fill the annular space inside with solder, as shown at E. The bead is now heated by a spirit-lamp or other suitable means, and while hot the space is filled with very hard pewter solder. When full a copper screw is inserted in the opening $d$ and the shells allowed to cool off, after which they are finished in the usual manner, when the boiler is ready for use.

It is obvious that the shells A B need not be made respectively in one piece; but each part may be made by several longitudinal parts or sections, united by brazed joints to form the complete seamless shell.

It is also obvious that this improvement is applicable to other cylindrical vessels which are required to stand a great internal pressure—such as soda-water fountains—the ring of solder E forming a perfectly tight and solid lock-joint between the two shells A B.

Having thus described my invention, I claim and desire to secure by Letters Patent of the United States—

The described kitchen-boiler, composed of the overlapping seamless shells A and B, provided with the registering beads D C, flanged collar $b$, and having a thin band or filling of solder between the laps, independently of the thick ring E, of the same material, as set forth.

In testimony that I claim the foregoing as my own I have hereto affixed my signature in presence of two witnesses.

GEORGE SALMON.

Witnesses:
JAMES COLEMAN,
WILLIAM HAMPRON.